United States Patent
Maitenaz

[11] 3,910,691
[45] Oct. 7, 1975

[54] OPHTHALMIC LENSES WITH PROGRESSIVELY VARYING FOCAL POWER

[75] Inventor: Bernard F. Maitenaz, Joinville-le-Pont, France

[73] Assignee: Essilor International, Joinville-le-Pont, France

[22] Filed: July 23, 1973

[21] Appl. No.: 381,476

[30] Foreign Application Priority Data
July 26, 1972 France .............. 72.26947

[52] U.S. Cl. ............... 351/169; 351/176; 350/189
[51] Int. Cl.² .......................................... G02C 7/06
[58] Field of Search ............ 351/169, 176; 350/189

[56] References Cited
UNITED STATES PATENTS

| | | | |
|---|---|---|---|
| 2,109,474 | 3/1938 | Evans | 351/169 |
| 2,878,721 | 3/1959 | Kanolt | 351/169 |
| 3,468,067 | 9/1969 | Larson | 351/169 X |
| 3,687,528 | 8/1972 | Maitenaz | 351/169 |
| 3,711,191 | 1/1973 | Tagnon | 351/169 |

Primary Examiner—David H. Rubin

[57] ABSTRACT

Ophthalmic lens having an aspheric surface of which the section taken through a substantially vertical plane is an umbilical curve along which the focal power of the lens varies progressively. At each point $B_{ij}$ of the aspheric surface the section of this surface through a substantially vertical plane $\pi_j$ parallel to the plane $\pi$ of the umbilical curve $MM_1$ is a curve $\Sigma_j$ the curvature $C_{B_{ij}}$ of which at said point $B_{ij}$ complies with the relationship:

$$\left| C_{B_{ij}} - C_{A_i} \right| \leq N$$

Wherein $C_{A_i}$ is the curvature of said umbilical curve $MM_1$ at a point $A_i$ of said umbilical curve which lies on a same horizontal section $S_i$ as said point $B_{ij}$, the lens being in its position of use, $N$ being a number having a predetermined value complying with the relationship $$N \leq 3.5\, A$$

wherein $A$ is the power addition, in dioptres, between the distant-vision center and the close-vision center of the lens.

2 Claims, 15 Drawing Figures

| $V_Y$ \ $V_X$ | 0° | 2°.8 | 5°.6 | 8°.4 | 11°.2 | 14° | 16°.8 | 19°.6 |
|---|---|---|---|---|---|---|---|---|
| 19°.6 | 0.1245 | 0.1353 | 0.1657 | 0.2133 | 0.2757 | | | |
| 16°.8 | 0.0869 | 0.0937 | 0.1144 | 0.1491 | 0.1985 | 0.2630 | | |
| 14° | 0.0634 | 0.0669 | 0.0794 | 0.1033 | 0.1414 | 0.1961 | 0.2694 | |
| 11°.2 | 0.0468 | 0.0481 | 0.0551 | 0.0717 | 0.1019 | 0.1497 | 0.2184 | 0.3112 |
| 8°.4 | 0.0321 | 0.0327 | 0.0377 | 0.0516 | 0.0791 | 0.1244 | 0.1913 | 0.2838 |
| 5°.6 | 0.0178 | 0.0191 | 0.0261 | 0.0427 | 0.0729 | 0.1207 | 0.1894 | 0.2822 |
| 2°.8 | 0.0055 | 0.0090 | 0.0215 | 0.0454 | 0.0835 | 0.1382 | 0.2115 | 0.3060 |
| 0° | 0.0000 | 0.0068 | 0.0275 | 0.0622 | 0.1116 | 0.1761 | 0.2562 | 0.3530 |
| −2°.8 | 0.0086 | 0.0194 | 0.0498 | 0.0974 | 0.1598 | 0.2355 | 0.3231 | 0.4227 |
| −5°.6 | 0.0398 | 0.0548 | 0.0954 | 0.1557 | 0.2307 | 0.3167 | 0.4110 | 0.5135 |
| −8°.4 | 0.1029 | 0.1217 | 0.1711 | 0.2419 | 0.3263 | 0.4194 | 0.5178 | 0.6228 |
| −11°.2 | 0.2061 | 0.2275 | 0.2825 | 0.3589 | 0.4467 | 0.5405 | 0.6383 | 0.7449 |
| −14° | 0.3555 | 0.3781 | 0.4344 | 0.5098 | 0.5933 | 0.6801 | 0.7714 | |
| −16°.8 | 0.5540 | 0.5764 | 0.6300 | 0.6983 | 0.7698 | 0.8418 | | |
| −19°.6 | 0.8018 | 0.8231 | 0.8711 | 0.9276 | 0.9809 | | | |

| $V_Y$ \ $V_X$ | 0° | 2°.8 | 5°.6 | 8°.4 | 11°.2 | 14° | 16°.8 | 19°.6 |
|---|---|---|---|---|---|---|---|---|
| | M | | | | | | | |
| 19°.6 | 13.59 | 13.59 | 13.64 | 13.61 | 13.59 | | | |
| 16°.8 | 13.06 | 13.10 | 13.13 | 13.28 | 13.36 | 13.44 | | |
| 14° | 12.60 | 12.68 | 12.81 | 13.04 | 13.25 | 13.38 | 13.53 | |
| 11°.2 | 12.28 | 12.41 | 12.58 | 12.89 | 13.25 | 13.49 | 13.66 | 13.81 |
| 8°.4 | 12.19 | 12.32 | 12.51 | 12.91 | 13.21 | 13.51 | 13.76 | 13.81 |
| 5°.6 | 12.32 | 12.43 | 12.60 | 12.89 | 13.25 | 13.49 | 13.68 | 13.81 |
| 2°.8 | 12.60 | 12.68 | 12.81 | 13.02 | 13.21 | 13.36 | 13.53 | 13.51 |
| 0° | 13.06 | 13.11 | 13.17 | 13.29 | 13.36 | 13.46 | 13.49 | 13.44 |
| −2°.8 | 13.59 | 13.61 | 13.66 | 13.59 | 13.59 | 13.51 | 13.46 | 13.42 |
| −5°.6 | 14.19 | 14.16 | 14.10 | 13.95 | 13.80 | 13.57 | 13.42 | 13.66 |
| −8°.4 | 14.68 | 14.65 | 14.42 | 14.14 | 13.81 | 13.38 | 13.10 | 13.10 |
| −11°.2 | 15.08 | 15.06 | 14.74 | 14.36 | 13.95 | 13.46 | 13.10 | 13.06 |
| −14° | 15.27 | 15.21 | 14.95 | 14.57 | 14.10 | 13.61 | 13.25 | |
| −16°.8 | 15.23 | 15.23 | 15.04 | 14.74 | 14.34 | 14.02 | | |
| −19°.6 | 15.12 | 15.12 | 14.99 | 14.74 | 14.46 | | | |
| | $M_1$ | | | | | | | |

| $V_Y$ \ $V_X$ | 0° | 2.8 | 5.6 | 8.4 | 11.2 | 14° | 16.8 | 19.6 |
|---|---|---|---|---|---|---|---|---|
| | M | | | | | | | |
| 19.6 | 0.1834 | 0.1988 | 0.2406 | 0.3033 | 0.3816 | | | |
| 16.8 | 0.1279 | 0.1374 | 0.1656 | 0.2118 | 0.2756 | 0.3568 | | |
| 14° | 0.0934 | 0.0981 | 0.1149 | 0.1471 | 0.1974 | 0.2683 | 0.3618 | |
| 11.2 | 0.0689 | 0.0706 | 0.0796 | 0.1014 | 0.1416 | 0.2046 | 0.2936 | 0.4118 |
| 8.4 | 0.0474 | 0.0478 | 0.0539 | 0.0721 | 0.1086 | 0.1683 | 0.2556 | 0.3743 |
| 5.6 | 0.0263 | 0.0279 | 0.0369 | 0.0588 | 0.0989 | 0.1619 | 0.2509 | 0.3691 |
| 2.8 | 0.0081 | 0.0128 | 0.0296 | 0.0618 | 0.1121 | 0.1829 | 0.2764 | 0.3946 |
| 0° | 0.0000 | 0.0094 | 0.0376 | 0.0838 | 0.1476 | 0.2288 | 0.3274 | 0.4451 |
| 2.8 | 0.0126 | 0.0279 | 0.0698 | 0.1324 | 0.2108 | 0.3021 | 0.4051 | 0.5224 |
| 5.6 | 0.0591 | 0.0811 | 0.1376 | 0.2164 | 0.3079 | 0.4064 | 0.5113 | 0.6286 |
| 8.4 | 0.1539 | 0.1828 | 0.2539 | 0.3473 | 0.4476 | 0.5486 | 0.6509 | 0.7693 |
| 11.2 | 0.3126 | 0.3481 | 0.4321 | 0.5363 | 0.6398 | 0.7351 | 0.8294 | 0.9502 |
| 14° | 0.5509 | 0.5926 | 0.6866 | 0.7954 | 0.8926 | 0.9729 | 1.0514 | |
| 16.8 | 0.8831 | 0.9297 | 1.0297 | 1.1351 | 1.2149 | 1.2669 | | |
| 19.6 | 1.3217 | 1.3722 | 1.4726 | 1.5649 | 1.6129 | | | |
| | $M_1$ | | | | | | | |

Fig. 11b.

| $V_Y$ \ $V_X$ | 0 | 2.8 | 5.6 | 8.4 | 11.2 | 14 | 16.8 | 19.6 |
|---|---|---|---|---|---|---|---|---|
| 19.6 | 14.30 | 14.36 | 14.49 | 14.30 | 14.24 | | | |
| 16.8 | 13.48 | 13.58 | 13.64 | 13.77 | 13.73 | 13.70 | | |
| 14 | 12.79 | 12.95 | 13.07 | 13.23 | 13.39 | 13.51 | 13.51 | |
| 11.2 | 12.35 | 12.48 | 12.79 | 13.20 | 13.61 | 13.83 | 14.11 | 14.18 |
| 8.4 | 12.19 | 12.44 | 12.79 | 13.26 | 13.61 | 14.02 | 14.36 | 14.27 |
| 5.6 | 12.35 | 12.48 | 12.79 | 13.20 | 13.61 | 13.83 | 14.11 | 14.18 |
| 2.8 | 12.70 | 12.95 | 13.07 | 13.23 | 13.39 | 13.51 | 13.51 | 13.36 |
| 0 | 13.48 | 13.58 | 13.64 | 13.77 | 13.73 | 13.70 | 13.51 | 13.36 |
| -2.8 | 14.30 | 14.36 | 14.49 | 14.30 | 14.24 | 13.99 | 13.73 | 13.70 |
| -5.6 | 15.18 | 15.20 | 15.25 | 15.15 | 14.93 | 14.55 | 14.36 | 14.27 |
| -8.4 | 16.16 | 16.16 | 15.97 | 15.85 | 15.66 | 15.15 | 14.68 | 15.00 |
| -11.2 | 17.20 | 17.23 | 16.95 | 16.60 | 16.03 | 15.56 | 14.90 | 15.15 |
| -14 | 18.08 | 18.02 | 17.73 | 17.26 | 16.60 | 15.78 | 15.18 | |
| -16.8 | 18.81 | 18.81 | 18.43 | 17.89 | 16.88 | 16.10 | | |
| -19.6 | 19.44 | 19.40 | 18.93 | 18.11 | 17.10 | | | |

OPHTHALMIC LENSES WITH PROGRESSIVELY VARYING FOCAL POWER

BACKGROUND OF THE INVENTION

1. Field of the Invention

The present invention relates in general to ophthalmic lenses and has specific reference to an ophthalmic lens with a progressively varying focal power comprising an aspheric surface of which the cross-section taken in a substantially vertical plane containing the optical axis of the lens is an umbilical curve, i.e. a curve along which at each and any point thereof the two main radii of curvature of the aspheric surface are of equal value, and of which the curvature varies at least between one point of said curve, called distant-vision center, and another point of said curve, called close-vision center, in order to provide a progressive increment in the focal power of the lens when the light beam penetrating into the eye of the spectacle wearer scans the lens surface between the distant-vision center and the close-vision center while following said umbilical curve.

2. Description of the Prior Art

In the progressive focal power ophthalmic lenses described in the U.S. Pat. Nos. 2,869,422 and 2,915,856, the aberrations due to astigmatism, distortion and field curvature are zero along the umbilical curve and also zero or very moderate in an elongated and narrow area extending along said umbilical curve, between the distant-vision center and the close-vision center, said area admitting said umbilical line as its longitudinal median line. In the lateral portions of the lens, which extend on either side of said elongated and narrow area free of astigmatism and field curvature aberration, this lens is characterized by particularly detrimental distortion aberrations. This distortion causes a regular grid observed through the lens to assume the appearance of a distorted and twisted grid outside the aberration-free lens areas.

With the provisions disclosed in U.S. Pat. No. 3,687,528, a compromise is achieved whereby, notwithstanding the acceptance of the possibility that the astigmatism and field curvature aberrations might assume a certain value (lower, of course, than the wearer's threshold of tolerance) in the above-defined elongated and narrow area, the distortion is reduced very strongly throughout the lens surface. This feature permits notably the observation of a regular grid without any appreciable deformation of the horizontal and vertical lines in the lateral portions of said grid. However, although the use of ophthalmic lenses according to this last-mentioned U.S. Pat. No. 3,687,528 improves considerably the visual comfort in the case of static vision through the lateral portions of the lens, it appeared that these lenses were not fully satisfactory in the case of dynamic vision corresponding to the normal, current use of ophthalmic spectacles. In the present disclosure, the term "static vision" refers to the case wherein, when the eye aiming at a point-object through the lens, the light beam penetrating into the eye for forming the image of said point-object constantly intersects the same portion of the lens surface; on the other hand, the term "dynamic vision" refers to all cases wherein, when the eye is aiming at a point-object through the lens, the light beam useful for forming the image of the point-object scans the lens surface as a consequence of a relative movement produced between the eye and the lens. This relative movement may be caused either by the mobility of the object observed by the eye through the lens, so that the eye is caused to rotate about its center of rotation, with the wearer's head remaining stationary, or by the fact that the observed object is stationary but the spectacle wearer rotates his or her head, for example about his or her cervical vertebra while the eye remains trained on the fixed object. Thus, when vertical or horizontal lines are observed through a lens made according to the teachings of the aforesaid U.S. Pat. No. 3,687,528, and, during this observation, the light beam scans the lens surface horizontally or vertically, respectively, the spectacle wearer will see said vertical or horizontal lines undergoing a distortion during said scanning, which is not only unpleasant but also makes it difficult to get used to such lenses, and may even give rise to serious discomfort.

SUMMARY OF THE INVENTION

It is the primary object of the present invention to provide a lens with a progressively varying focal power that can be worn more easily by the user, said lens being characterized notably by a considerably improved comfort in case of dynamic vision.

To this end, the present invention provides an ophthalmic lens with a progressively varying focal power of the type broadly set forth hereinabove, which is characterized essentially in that, at each point $B_{ij}$ of the aspheric surface, the cross-section of this aspheric surface taken along a substantially vertical plane parallel to the plane of the umbilical curve is a curve of which the curvature $C_{B_{ij}}$ at said point $B_{ij}$ complies with the following relationship:

$$\left| C_{B_{ij}} - C_{A_i} \right| \leq N \quad (1)$$

wherein $C_A$ is the curvature of the umbilical curve at point $A_i$ of this curve which is located on a same horizontal section as said point $B_{ij}$, with the lens being in its position of use, and $N$ is a number having a predetermined value complying with the following relationship:

$$N \leq 3.5 \, A \quad (2)$$

wherein $A$ is the power addition in dioptres, between the distant-vision center and the close-vision center.

With these provisions a reduction in the rate of variation of the distortion of the vertical or horizontal straight lines observed through the lens for a given value of the angular speed of the light beam scanning the aspheric surface of the lens is obtained, thereby insuring a greater comfort under dynamic vision conditions, as it will be explained presently. Therefore, a lens obtained by applying the teachings of this invention is much more pleasant to wear by most users and constitutes a definite technical improvements in relation to hitherto known lenses with a progressively varying focal power.

BRIEF DESCRIPTION OF THE DRAWING

A clearer understanding of this invention will be had if reference is made to the detailed description given hereinafter with reference to the attached drawings, in which.

DESCRIPTION OF THE PREFERRED EMBODIMENTS

Figure 1:
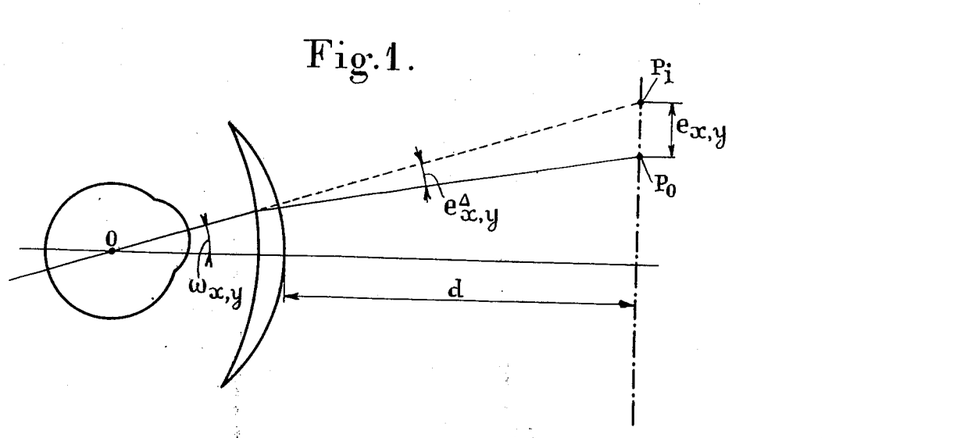
FIG. 1 is a diagrammatic view showing an eye having disposed in front thereof a lens with a progressively varying focal power, and the various parameters considered for estimating the distortion introduced by the lens as a function of the angular position of the eye.
Figure 2:
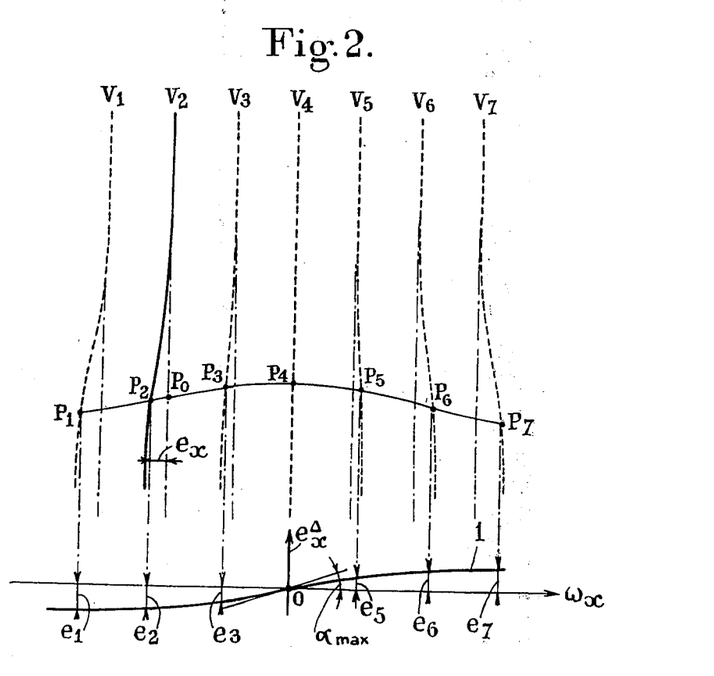
FIG. 2 shows in its upper portion the shape successively assumed by a vertical straight line observed through a conventional lens having a progressively varying focal power when travelling horizontally while remaining parallel to itself, and in its lower portion a diagram illustrating the variations in the horizontal distance measured between the image of a point of the moving vertical straight line and the position which the image of said point would occupy under distortion-free conditions, as a function of the angular position of the eye during the horizontal scanning of the lens.
Figure 3:
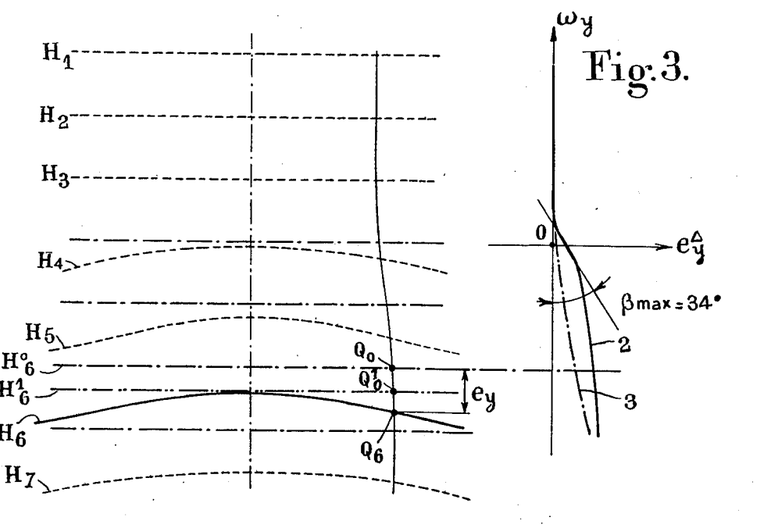
FIG. 3 is a diagram similar to the diagram of FIG. 2 but in the case of a horizontal straight line moving vertically while remaining parallel to itself.

Before describing the present invention, it is deemed necessary to explain more in detail, with reference to FIGS. 1 to 3, the meaning of dynamic vision and the corresponding distortion introduced by ophthalmic lens with a progressively varying focal power, in the case of a vertical straight line moving horizontally while remaining parallel to itself in a plane perpendicular to the optical axis of the lens, and in the case of a horizontal straight line moving vertically while remaining parallel to itself, also in a plane perpendicular to the optical axis of the lens.

Referring firstly to FIG. 2, the lines $V_1, V_2, V_3 \ldots V_7$ represent the images of the above-mentioned vertical straight line as seen through a known lens with a progressively varying focal power, corresponding to various successive positions of this vertical straight line during its movement. The above-mentioned images $V_1$ to $V_7$ are those obtained when the eye is aiming at the middle point of the straight line and when the light beam forming the image of this middle point scans the median horizontal section of the lens during the horizontal movement of the vertical straight line. To understand the nature of the distortion introduced by the lens during the horizontal lateral scanning movement, it is appropriate to firstly study for a point P of the vertical straight line the variation of the horizontal distance $e_x$ between the distorted image $P_i$ ($i = 1, 2, 3 \ldots 7$) of said point P and the position $P_0$ which said point P of said vertical line would occupy if there was no distortion at all. In FIG. 2, this distance $e_x$ is shown in connection with the image $P_2$ of point P on said vertical straight line when the image of this line is at $V_2$. The successive values $e_1, e_2, e_3 \ldots e_7$ of the distance $e_x$ measured for said point P of said straight line are plotted in the diagram in the lower portion of FIG. 2. The curve 1 thus obtained illustrates the manner in which the distance $e_x$ varies as a function of the angle $\omega_x$ formed between the sight axis and the optical axis of the lens (FIG. 1) during the lateral horizontal scanning movement. In fact, as shown in FIG. 1, the value $e_x$ (or $e_y$ as will be explained hereinafter) depends on the distance $d$ between the lens and the plane in which the vertical straight line (or the horizontal straight line, as will be seen hereinafter with reference to FIG. 3) is moving. Therefore, it is preferable to estimate the distance $e_x$ (or $e_y$) due to distortion in prismatic dioptres. It is reminded that a deflection $e_x \Delta$ (or $e_y \Delta$) of one prismatic dioptre is equivalent to a distance $e_x$ (or $e_y$) of one centimeter for a distance $d$ of one meter.

Referring again to the diagram of FIG. 2, it will be seen that the distances $e_1$ and $e_7$ denote the maximum distortion of the vertical straight line. The comfort under static, lateral vision conditions is subordinate to the magnitude of these distortions. On the other hand, the dynamic visual comfort is not dependent on the magnitude of said distances $e_x$ but to the magnitude of its variations for a given scanning movement. Practical tests confirmed this obvious theorical idea that the faster the change in the value of the image distortion for a given angular speed of the scanning movement, the more this distortion is detected by the eye and the lesser the dynamic visual comfort. Consequently, the apparently more representative magnitude of the dynamic visual comfort is no longer the maximum value of $e_x$ but the maximum value of $de_x/d\omega_x$, i.e. the maximum angle $\alpha_{max}$ formed between the tangent to said curve 1 and the abscissa line. In FIG. 2, it will be seen that this angle $\alpha_{max}$ is the angle formed between the tangent to said curve 1 at the point of this curve which corresponds to the case in which the vertical straight line lies in the vertical median plane of the lens. To sum up, the smaller this angle $\alpha_{max}$, the greater the horizontal dynamic visual comfort.

Of course, the above explanation concerning the horizontal relative movements of a vertical straight line is also applicable to the vertical relative movements of a horizontal straight line, but in this last case the visual consequences of the distortion are further aggravated by the fact that the magnification varies in the vertical direction as a consequence of the variation in the focal power along a vertical or substantially vertical umbilical curve.

As a matter of fact, as shown in FIG. 3 illustrating the successive images $H_1, H_2, H_3 \ldots H_7$ of a horizontal line observed through a known lens with a progressively varying focal power, which line moves vertically while remaining parallel to itself in a vertical plane perpendicular to the optical axis of the lens, this horizontal straight line should be seen at a given time during its movement for example at $H_6^1$, not at $H_6^0$, even if no distortion occurs, because during the vertical scanning of the lens by the light beam necessary for forming the image of the middle point of the horizontal straight line sighted by the eye, the focal power and consequently the vertical magnification increased when the horizontal straight line passed from its position corresponding to the image seen at $H_4$ to the position corresponding to the image seen at $H_6$.

In fact, due to the distortion, it is in this last position $H_6$ that the eye sees the horizontal straight line at the above-mentioned time, not in position $H_6^1$. Thus, for a point Q of the horizontal straight line which, at a given time, is seen by the eye through the lens for example at $Q_6$, it is possible to measure a discrepancy $e_y$ of which the portion $Q_0 Q_0^1$ is due to the magnification, whereas the portion $Q_0^1 Q_6$ is due to the distortion. As in the case of point P of the vertical movable straight line of FIG. 2, one may trace for the point Q of the horizontal straight line, when the latter travels vertically while remaining parallel to itself, the curve 2 of variation of $e_y \Delta$, expressed in prismatic dioptres, as a function of the angle $\omega_y$ formed between the sight axis and the optical axis of the lens. This curve 2 is illustrated, in the diagram in the right-hand portion of FIG. 3. In this diagram, the dash and dot curve 3 illustrates the variations of $Q_0 Q_0^1$ as a function of $\omega_y$.

As already explained in the foregoing with reference to the horizontal movements, the visual comfort in the case of vertical relative movements is subordinate to the value of the maximum angle $\beta_{max}$ formed by the tangent to the curve representing the variations of $e_y \Delta$ as a function of $\omega_y$, for example curve 2 in the diagram of FIG. 3. Thus, more particularly, the smaller the angle $\beta_{max}$, the greater the dynamic visual comfort. In the example shown in FIG. 3, the angle $\beta$ has its maximum value when the moving horizontal straight line is coincident with the horizontal median plane of the lens, and in a typical example of known progressive focal power lens the value of this angle $\beta_{max}$ is of the order of 34°.

To be more comprehensive, it may be added to the above explanation that this decomposition into vertical and horizontal movements is an artificial one and that the movements of the spectacles wearer's head or eyes take place in general in an oblique direction with respect to the vertical and to the horizontal. Therefore the global distortion under dynamic vision conditions will appear as consisting of the combination of the two horizontal and vertical components discussed hereinabove. The dynamic visual comfort will therefore depend on the simultaneous minimization of the vertical dynamic distortion and of the horizontal dynamic distortion, i.e. on the simultaneous reduction of the above-defined angles $\alpha_{max}$ and $\beta_{max}$. This reduction is very important, for it was proved that if under static vision condition the brain will rapidly compensate the distortion, it operates very moderately or very slowly for compensating the distortion under dynamic vision condition, which therefore constitutes a considerable visual interference.

Figure 4:
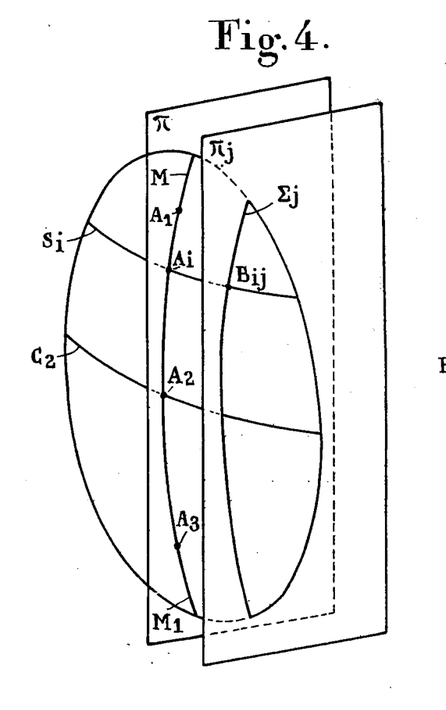
FIG. 4 illustrates diagrammatically, in perspective, the aspheric surface of a lens with a progressively varying focal power according to the present invention.

Research work carried out in connection with the surfaces of the lenses described in the aforesaid U.S. Pat. No. 3,687,528 proved that to obtain a satisfactory dynamic visual comfort it is not sufficient to retort simply to aspheric surfaces of which the section $S_i$ taken through horizontal planes are curves of which the radius of curvature decreases (the curvature increases) in the direction away from the point $A_i$ of intersection of the section $S_i$ with the substantially vertical umbilical curve $MM_1$, if the radius of curvature of the umbilical curve $MM_1$ at point $A_i$ is greater than the radius of curvature of the single horizontal circular section $C_2$, and of which the radius of curvature increases (the curvature decreases) in the direction away from said point $A_i$, if the radius of curvature of the umbilical curve $MM_1$ at point $A_i$ is smaller than the radius of curvature of the single circular horizontal section $C_2$ (FIG. 4). Similarly, the fact that the horizontal sections of the surface which pass through the distant vision center $A_1$ and the close vision center $A_3$ are also umbilical curves and/or curves along which the vertical component of the prismatic effect is constant, and the fact that the aspheric surface comprises in its lateral portions at least one vertical section along which the horizontal component of the prismatic effect is constant, provide an improved comfort under static vision conditions but are not sufficient for giving a satisfactory comfort under dynamic-vision conditions.

According to the present invention, it was discovered after long researches that a substantially satisfactory dynamic visual comfort is obtained if, at each point $B_{ij}$ of the aspheric surface of the lens, the section of said aspheric surface taken in a substantially vertical plane $\pi_j$ parallel to the plane $\pi$ of the umbilical curve $MM_1$, is a curve $\Sigma_j$ of which the curvature $C_{Bij}$ at said point $B_{ij}$ complies with the relationship:

$$\left| C_{B_{ij}} - C_{A_i} \right| \leq N \quad (1)$$

wherein $C_{A_i}$ is the curvature of the umbilical curve $MM_1$ at point $A_i$ of this umbilical curve which is located on the same horizontal section $S_i$ as the above-mentioned point $B_{ij}$ (considering the lens in its position of use) and $N$ is a number having a predetermined value complying with the relationship:

$$N \leq 3.5 \, A \quad (2)$$

wherein $A$ is the power addition, in dioptres, between the distant-vision and close-vision centers $A_1$ and $A_3$, respectively (FIG. 4). Preferably, $N$ will have a value given by the relationship:

$$N = 3 \, A \quad (3)$$

These new requirements (1) and (2), or (1) and (3) imposed to the aspheric surface of the lens with a progressively varying focal power according to the present invention permit of obtaining ophthalmic lenses giving a satisfactory visual comfort under vertical dynamic vision conditions. It would be advantageous that the maximum difference between curvatures $C_{Bij}$ and $C_{Ai}$ be still lower than 3A, but this requirement will rapidly become too difficult to be consistent with the feature or features described in said U.S. Pat. No. 3,687,528. On the other hand, if the above-mentioned requirements concerning the vertical dynamic visual comfort are met, experience teaches that the horizontal dynamic visual comfort thus obtained is also satisfactory.

Assuming that the value of N is 3A, the relationship (1) may also be written as follows:

$$C_{Ai} - 3A \leq C_{Bij} \leq C_{Ai} + 3A \quad (4)$$

Let $R_i$ be the radius of curvature of the umbilical curve $MM_1$ at $A_i$ and $R_{ij}$ be the radius of curvature of the vertical section $\Sigma_j$ at point $B_{ij}$, the above relationship (4) may also be written as follows:

$$\frac{1}{R_i^{-1} + 3A} \leq R_{ij} \leq \frac{1}{R_i^{-1} - 3A} \quad (5)$$

Figure 5:
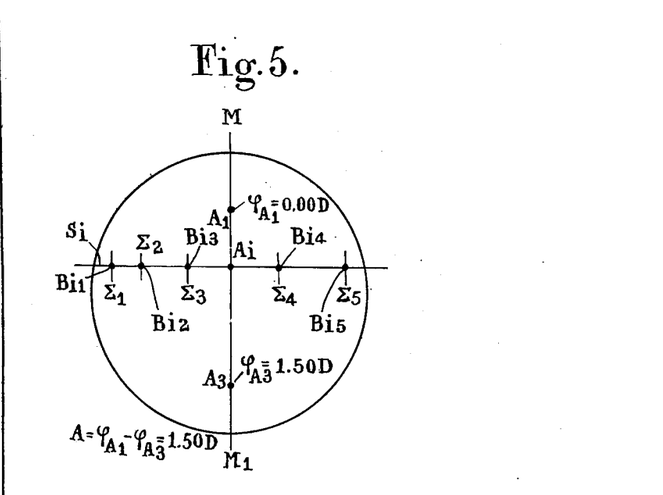
FIG. 5 is a front view of the aspheric surface of a lens of this invention and having a power addition of 1.50 D between the distant-vision and close-vision centers.

By way of example, considering a lens having a power addition $A = 1.50$ D, measured between the distant-vision center $A_1$ and the close-vision center $A_3$ spaced for example 25 mm from each other, if the radius of curvature of the umbilical curve $MM_1$ at point $A_i$ where this umbilical curve intersects a horizontal section $S_i$ of the aspheric lens surface is 60 mm, the radii of curvature of the vertical sections $\Sigma_1, \Sigma_2, \Sigma_3, \Sigma_4$ and $\Sigma_5$ of said aspheric surface at points $B_{i1}, B_{i2}, B_{i3}, B_{i4}$ and $B_{i5}$ respectively (FIG. 5), should all lie between a minimum value $R_{min}$ and a maximum value $R_{max}$ given by the following relationships:

$$R_{min} = \frac{1}{\frac{1}{0.060} + 4.5} = 0.047 \text{ m} = 47 \text{ millimeters} \quad (6)$$

$$R_{max} = \frac{1}{\frac{1}{0.060} - 4.5} = 0.082 \text{ m} = 82 \text{ mm} \quad (7)$$

Figure 6:
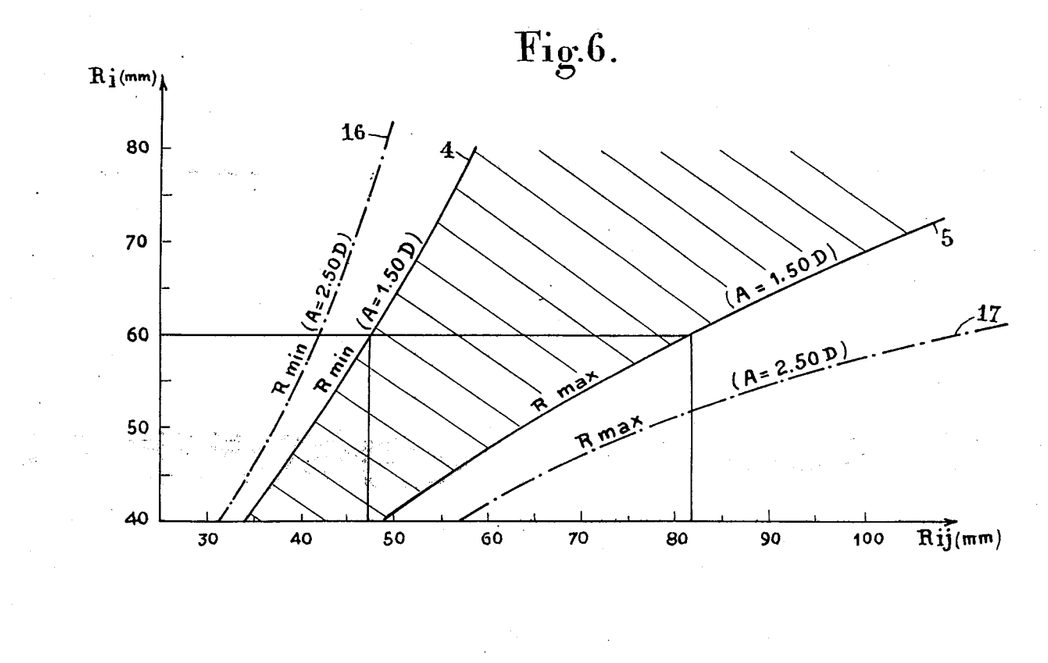
FIG. 6 is a diagram illustrating the minimum and maximum values of the radii of curvature of the vertical sections of the aspherical surface of the lens illustrated in FIG. 5, as a function of the radius of curvature of the vertical umbilical curve along which a gradual focal-power increment takes place.

In the diagram of FIG. 6 the two thick-line curves 4 and 5 illustrate as a function of the radius of curvature $R_i$ of umbilical line $MM_1$, the values of the minimum and maximum radii of curvature, respectively, between which the radii of curvature $R_{ij}$ of the vertical sections of the aspheric surface of a lens according to the invention having a power addition of 1.50 D between the above-defined points $A_1$ and $A_3$, should lie.

By way of example, the method of calculating and obtaining the aspheric surface of a lens having a progressively varying focal power and a power addition of 1.50 D will now be described. As disclosed in the aforesaid U.S. Pat. No. 3,687,528 it is known that, as a first approximation, this aspheric surface may be considered as being generated by a series of conic sections forming the horizontal sections $S_i$ perpendicular to the umbilical curve $MM_1$. To calculate such aspheric surface the following procedure should be adhered to:

firstly, what can be termed the "skeleton" of this surface is determined from conventional optical calculation methods, this "skeleton" comprising for example:

a. the umbilical curve $MM_1$ having a contour selected to provide the desired law of progression of the focal lower along this umbilical curve, and possibly b. two other umbilical curves (not shown) passing through the distant-vision center $A_1$ and through the close-vision center $A_3$, respectively, said curves being perpendicular to the umbilical curve $MM_1$. Moreover, one may lay down as an additional requirement that at the two points which lie respectively on the two other umbilical curves aforesaid and which are equally spaced from the umbilical curve $MM_1$, the lateral magnifications have the same horizontal component; in other words, that at these two points the perpendicular to the aspheric surface forms equal angles with the plane containing the umbilical curve $MM_1$. Moreover, it may also be submitted as an additional requirement that along the two other aforementioned umbilical curves the planes tangent to the aspheric surface from a substantially constant angle with the plane containing the optical center of the lens, which plane is perpendicular to the umbilical curve $MM_1$, in other words, that along these two other umbilical curves the vertical component of the prismatic effect be constant.

This being granted, a computer is then utilized for calculating the families of conic sections containing the determined skeleton elements and meeting the above-mentioned requirements. This calculation of the aspheric surface is made by taking as a base a reference sphere having, say, a radius of 82.02 mm, the aspheric surface being determined by means of a table giving the discrepancies with respect to this sphere, calculated on the radii of this sphere which pass through a great number of regularly spaced points of said sphere "spotted" or marked through their spherical coordinates $V_x$ and $V_y$. For each family of sections $S_i$ meeting the above requirements the computer will provide directly in the same reference system the aberration chart, the prismatic effect chart and, from these prismatic effects, the distortions (static vision distortions). Then a choice or possibly interpolations must be made for correcting possible residual defects; thus, the horizontal sections $S_i$ may assume a shape other than that of a conic section.

It is at this point of the process that an action is taken for obtaining an aspheric surface according to this invention. In fact, the computer may also be programmed to deliver in the same reference system the radii of curvature or, preferably, the values of the curvatures of the sections taken through the aspheric surface along vertical planes parallel to the plane containing the umbilical curve $MM_1$. To each family of horizontal sections $S_i$ there corresponds, consequently, a table giving the values of the curvatures of the vertical sections of the aspheric surface. Then, among the families of curves, the one to be retained for the purpose of this invention is the family of which the table giving the curvatures of the vertical sections is such that for all the horizontal lines of this table the difference between each number displayed in the vertical columns of the table, corresponding for example to $V_x = 2.8°, 5.6°, 8.4°$... (see for example FIG. 7b) and the number lying on the same horizontal line in the vertical column corresponding to $V_x = 0°$ is at the most equal to 3.5 times the addition A expressed in dioptres, and preferably at most equal to 3A.

Figure 7A:
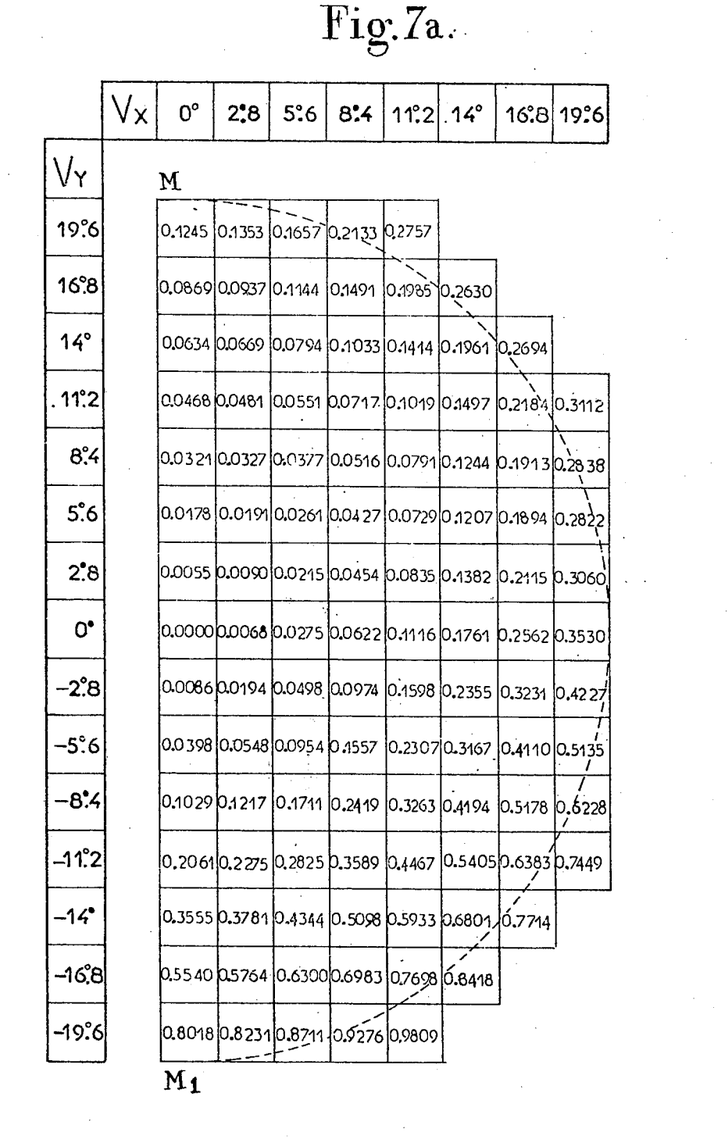
FIGS. 7a and 7b are tables showing the differences or discrepancies in millimeters in relation to a reference sphere and the curvatures of the vertical sections of the aspheric surface of a lens according to this invention, respectively, having a power addition of 1,50 D, at various points of the aspherical surfaces.
Figure 7B:
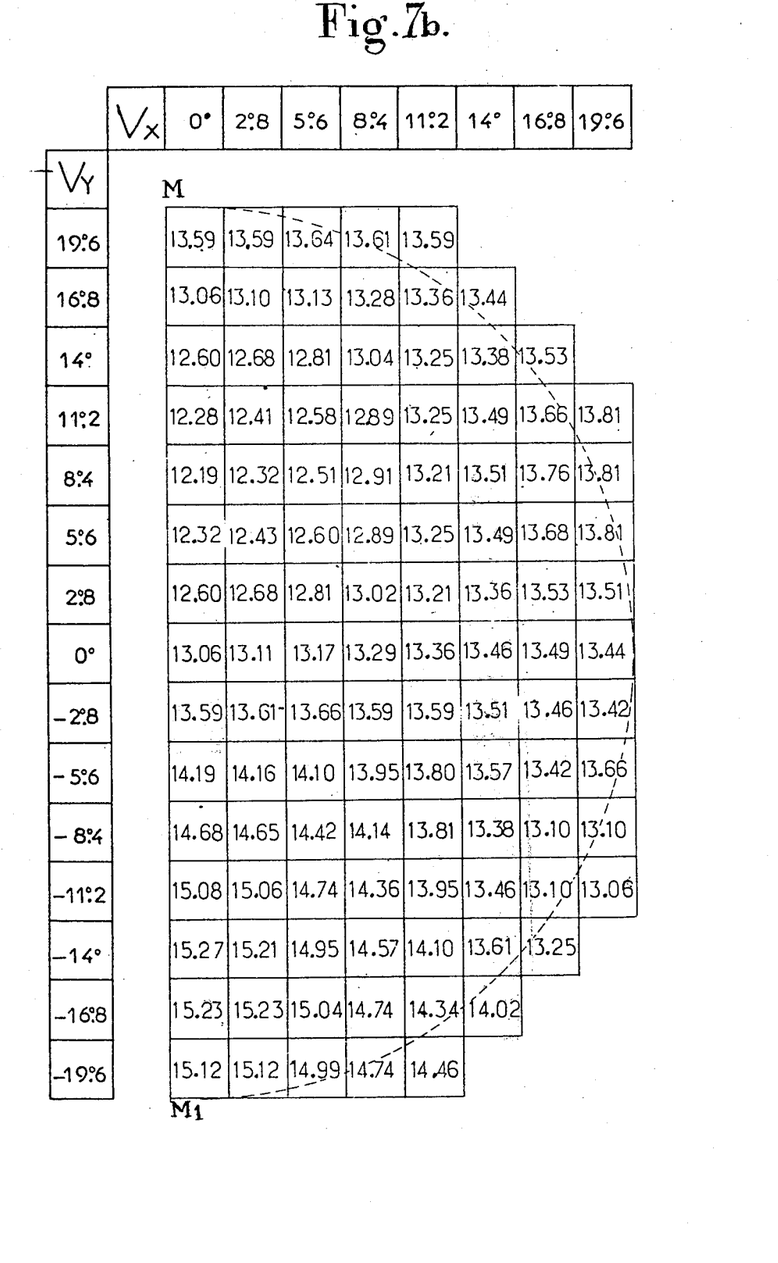

Then the computer delivers for the retained surface the table of the discrepancies in mm in relation to the reference sphere. FIGS. 7a and 7b show the table of the discrepancies in mm in relation to a reference sphere having a radius of 82.02 mm, and the table of the curvatures of the vertical sections of the aspheric surface of a lens according to this invention, having a power A of 1.50 D. It is reminded that the surfaces according to the present invention are symmetrical in relation to the plane containing the umbilical curve $MM_1$. It is for this reason that only one-half of each tables is given herein, the two tables being symmetrical in relation to their respective column $V_x = 0°$. On the other hand, although the tables given herein comprise but a relatively small number of values, the tables to be utilized in actual practice should comprise a considerably greater number of values, generally more than 2,000.

From the table of FIG. 7a giving the above-defined discrepancies (and comprising nevertheless a relatively great number of values), a model of the aspherical surface is cut in a block of special grade steel by using a grinder equipped with a diamond wheel reproducing by wearing effect the discrepancies indicated in this table at a great number of points on the surface of said block. This surface is reproduced in turn on a block of refractive material or on a material suitable for obtaining a mold permitting the ultimate reproduction of the lens by casting a polymerizable material therein. This surface is subsequently ground down to the desired smoothness and finally polished by using a flexible polishing member.

Figure 8:
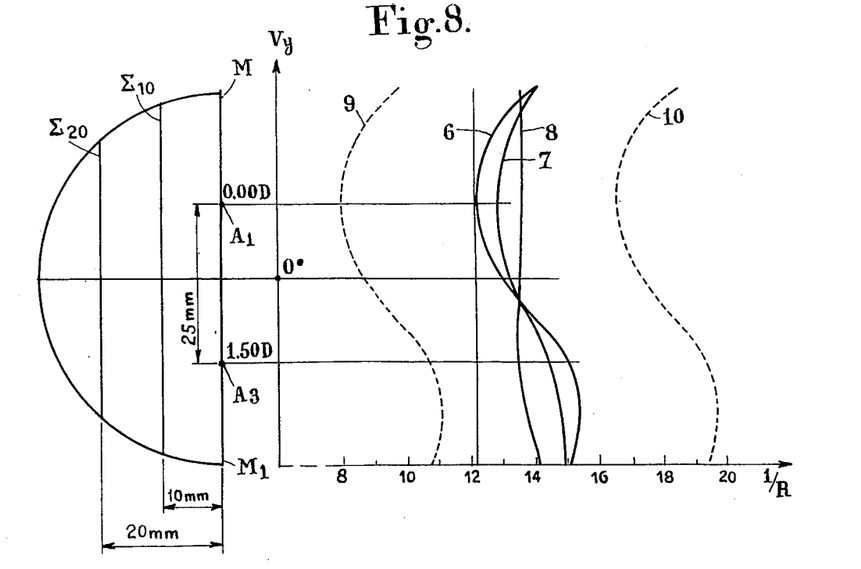
FIG. 8 is a diagram showing the variation of the curvature of the two vertical sections of the aspherical surface defined by the tables of FIGS. 7a and 7b, respectively through two planes parallel to the plane of the vertical umbilical curve and spaced from this plane by 10 and 20 mm, respectively.

In the diagram of FIG. 8, the curves 6, 7 and 8 illustrate the variation of the curvature of the umbilical curve $MM_1$, of the curvature of the vertical section $\Sigma_{10}$, and of the curvature of the vertical section $\Sigma_{20}$, respectively, of the aspheric surface defined by the table of FIGS. 7a and 7b as a function of the angle $V_y$. These sections $\Sigma_{10}$ and $\Sigma_{20}$ are spaced about 10 and 20 mm respectively from the plane of the umbilical curve $MM_1$, these values (10 and 20 mm) corresponding to values of $V_x$ equal to 7° and 14°, respectively. As clearly shown in FIG. 8, the curvature of these vertical sections constantly remain within the limits set by the relationship (4) given hereinabove, which limits are illustrated in FIG. 8 by the dash line curves 9 and 10.

Figure 9:
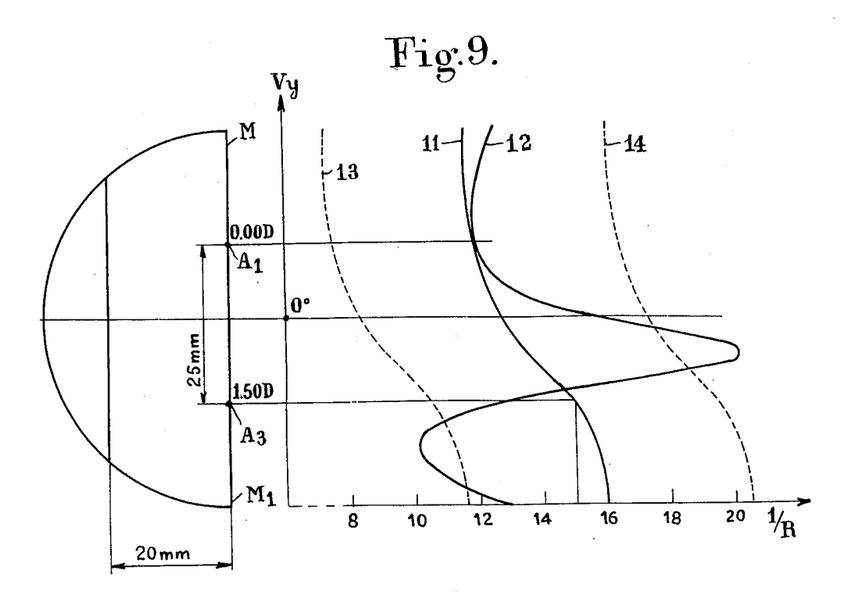
FIG. 9 is similar to FIG. 8 but shows by way of comparison the variation of the curvature of a vertical section of the aspheric surface of a conventional lens with a progressively varying focal power.

By way of comparison, FIG. 9 show the variation (curve 12) of the curvature of a vertical section located at a distance of 20 mm from the plane of the umbilical curve $MM_1$ of the aspheric surface of a known lens constructed according to the above U.S. Pat. No. 3,687,528 as a function of $V_y$. In FIG. 9 the curve 11 illustrates the variation of the curvature of the umbilical curve $MM_1$, and curves 13 and 14 illustrate the limits set by the relationship (4). As clearly apparent from this FIG. 9, the curvature of said vertical section lie outside the limits set by the present invention.

Figure 10:
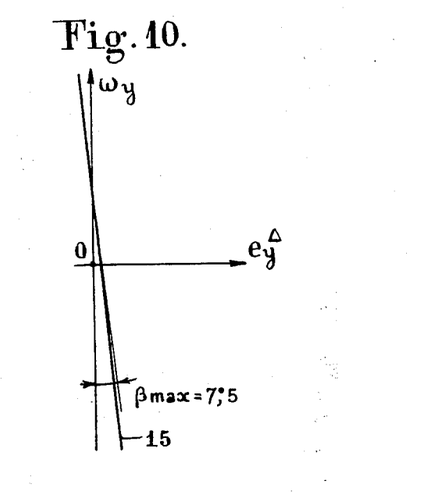
FIG. 10 is another diagram corresponding to the diagram illustrated in the right-hand portion of FIG. 3, in the case of the lens of this invention as defined by the tables of FIGS. 7a and 7b.

FIG. 10 shows a diagram of which the curve 15 was plotted under the same conditions as that of FIG. 3 but in the case of the lens according to this invention as defined by the table of FIG. 7a. As clearly apparent from this figure, the angle $\beta_{max}$ is approximately 7.5°, and this value is 5.2 times smaller than the value mentioned in FIG. 3 in connection with a known lens. Therefore, as already explained in the foregoing, the dynamic visual comfort thus obtained is definitely improved in comparison with the known lens.

Figure 11A:
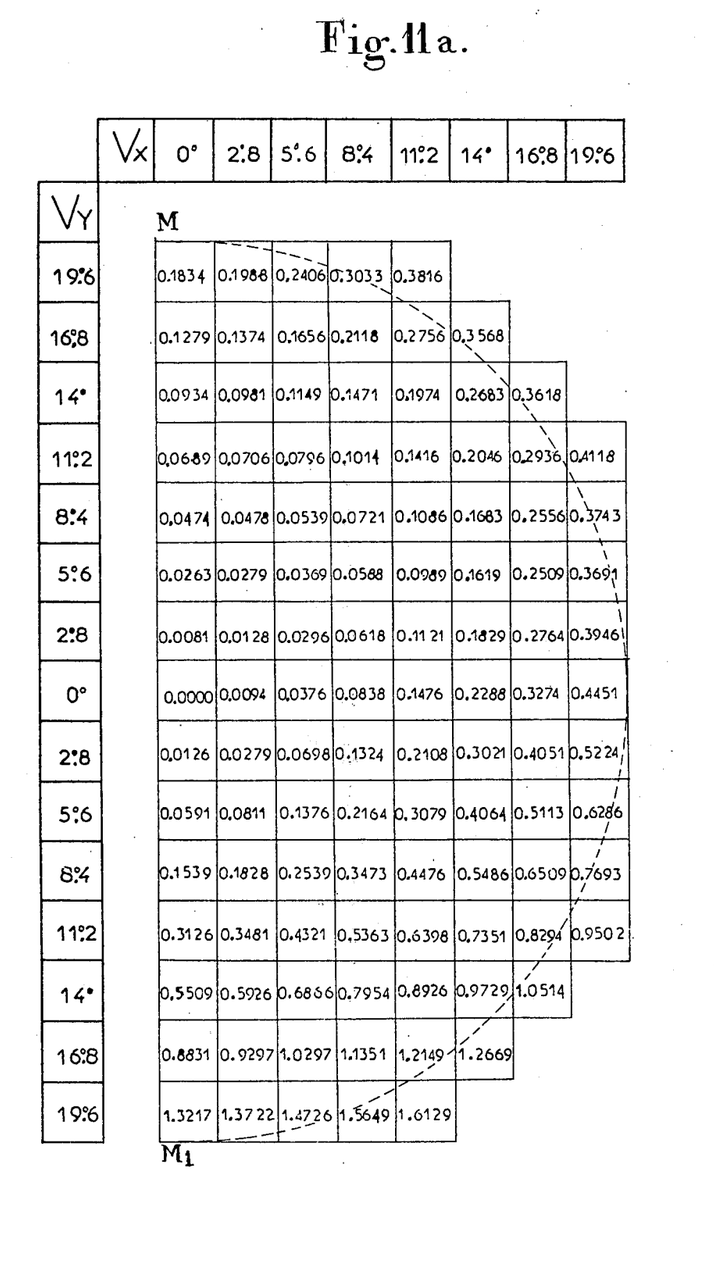
FIGS. 11a and 11b are tables similar to those of FIGS. 7a and 7b, respectively, in the case of another lens according to this invention, having a power addition of 2,50 D.
Figure 11B:
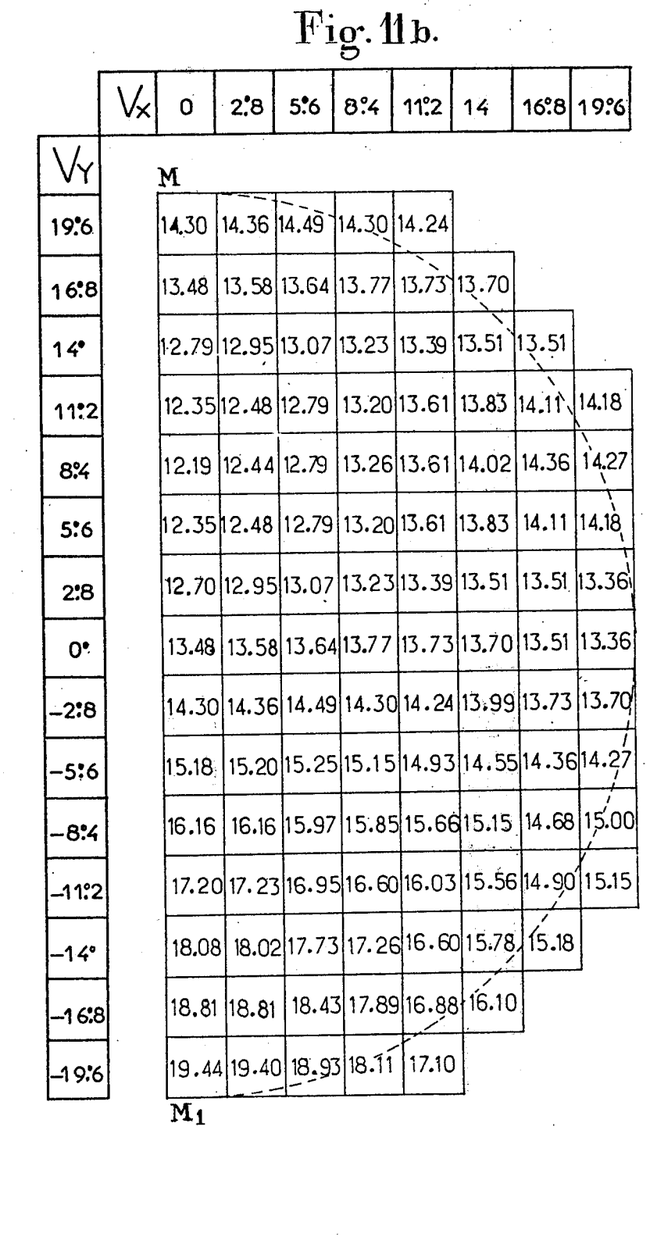

Another example of an aspheric surface for a lens of which the power addition A is 2.5 D will now be given. In FIG. 6, the dash and dot curves 16 and 17 display respectively, as a function of the radius of curvature $R_i$ of the umbilical curve $MM_1$, the values of the minimum radii of curvature and the maximum radii of curvature between which lie the radii of curvature $R_{ij}$ of the vertical sections of said non-spherical surface. FIGS. 11a and 11b which correspond to FIGS. 7a and 7b, respectively, of the preceding example, illustrate on the one hand a table of discrepancies displaying for a great number of points of the aspheric surface of the lens the discrepancies in millimeters in relation to a reference sphere having a radius of 82.02 mm, and on the other hand a table displaying for the same points as those in table of FIG. 11a the values of the curvatures of the vertical sections of said aspheric surface. As in the preceding example, it will be seen that for each line of table 11b if the difference between anyone of the values displayed in columns $V_x = 2.8°, 7.6°, 8.4°$ . . . and the value found on the same horizontal line in column $V_x = 0°$ is calculated, the resultant value is definitely lower than three times the addition A, i.e. 7.5 in the present example.

Figure 12:
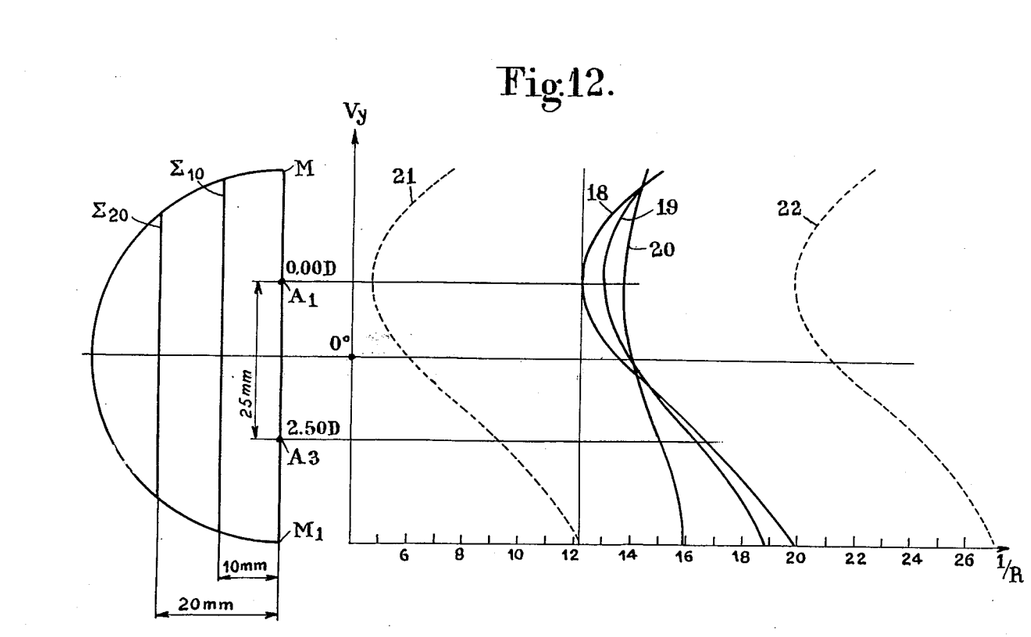
FIGS. 12 and 13 are similar to FIGS. 8 and 10, respectively, in the case of the lens of which the aspheric surface is defined by the tables of FIGS. 11a and 11b.

FIG. 12 is a diagram similar to FIG. 8. In this FIG. 12, the curves 18, 19 and 20 illustrate the variation of the curvature of the umbilical curve $MM_1$, of the curvature of the vertical section $\Sigma_{10}$ and of the curvature of the vertical section $\Sigma_{20}$, respectively, the two last-named sections $\Sigma_{10}$ $\Sigma_{20}$ being located 10 and 20 mm, respectively, from the plane of said umbilical curve $MM_1$. FIG. 12, also shows the curves 21 and 22, in dash lines, which illustrate the limits of curvature as defined by the above relationship (4). It will also be seen, in this case, that the curvatures of the two vertical sections involved lie within the limits set by the present invention.

Figure 13:
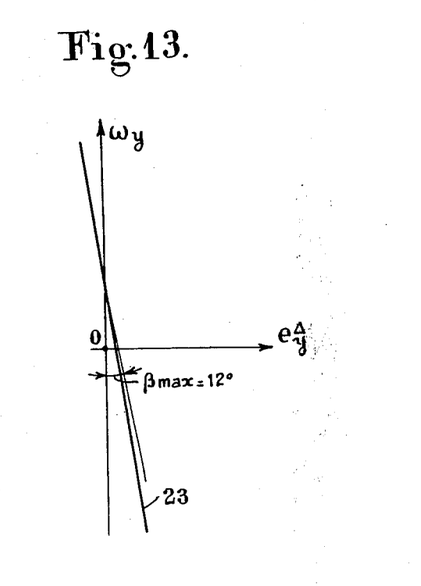

FIG. 13 shows a diagram wherein the curve 23 was plotted under the same conditions as those of the diagrams of FIGS. 3 and 10. In FIG. 13 it will be seen that the angle $\beta_{max}$ conditioning the vertical dynamic visual comfort is substantially 12°, so that the vision comfort is improved in comparison with known progressively variable focal power lenses in which the value of said angle $\beta_{max}$ may be as great as 56° when $A = 2.50$ D.

In the foregoing and the attached drawings it is assumed that the umbilical curve $MM_1$ extended in a substantially vertical plane. However, as will be readily apparent to those conversant with the art, and to take due account of the convergence of the wearer's sight when looking at a relatively near object it is also possible to mount the lens with a progressively varying focal power according to this invention in a spectacle frame in such position that the umbilical curve $MM_1$ be inclined a few degrees to the vertical, in the downward direction and from the temporal side to the nose side of the lens. Moreover, as already disclosed in the French Pat. No. 1,509,090, it is possible to construct a lens according to this invention in such a manner that the plane of the umbilical curve $MM_1$, inclined as explained above, substantially constitutes an oblique plane of symmetry for the aspheric lens surface.

Of course, it will readily occur to those conversant with the art that the various forms of embodiment described hereinabove should not be construed as limiting the field of this invention, since they merely constitute illustrative examples to which many modifications and variations may be brought without departing from the basic principles of this invention, as set forth in the appended claims.

What I claim is:

1. In an ophtalmic lens having a progressively variable focal power, and comprising a refracting surface with a generally vertical umbilical meridian curve having a radius of curvature the value of which progressively varies according to a predetermined law at least between one point of said meridian curve called distant-vision center, and another point of said curve called close-vision center, to provide a desired power addition along said meridian curve between said distant-vision and close-vision centers, said refracting surface having at each point of said meridian curve two main radii of curvature having identical values, said refracting surface further comprising a curve intersecting said meridian curve at right angles and lying in a plane also at right angles to said meridian curve, said intersecting curve being of substantially circular shape with a radius having a value equal to that of the radius of curvature of the meridian curve at the point of intersection of said meridian curve with said curve of substantially circular shape, and dividing said refracting surface into a first surface portion in which the value of the radius of curvature of the meridian curve decreases in the direction away from said point of intersection and a second surface portion in which the value of the radius of curvature of the meridian curve increases in the direction away from said intersection point, the sections of said first surface portion through planes at right angles to the meridian curve being non-circular curves intersecting said meridian curve at respective points of intersection, each of said non-circular section curves having a radius of curvature the value of which at the respective point of intersection with the meridian curve is equal to that of the radius of curvature of the meridian curve at said respective point of intersection and which increases from said value of the radius of curvature at the respective point of intersection in the direction away from said respective point of intersection, whereas the sections of said second surface portion through planes at right angles to the meridian curve are other non-circular curves intersecting said meridian curve at other respective points of intersection, each of said other non-circular section curves having a radius of curvature the value of which at the respective point of intersection with the meridian curve is equal to that of the radius of curvature of the meridian curve at said respective point of intersection and which decreases from said value of the radius of curvature at the respective point of intersection in the direction away from said respective point of intersection, the improvement consisting in that, at each point $B_{ij}$ of said aspheric surface, the section of said aspheric surface through a substantially vertical plane parallel to the plane of the generally vertical umbilical meridian curve is a curve of which the curvature $C_{B_{ij}}$ at said point $B_{ij}$ complies with the relationship:

$$\left| C_{B_{ij}} - C_{A_i} \right| \leq N$$

wherein $C_{A_i}$ is the curvature of said umbilical meridian curve at a point $A_i$ of said meridian curve which lies on a same horizontal section as said point $B_{ij}$ of the aspheric surface when the lens is in its position of use, and $N$ is a number having a predetermined value complying with the relationship:

$$N \leq 3.5\ A$$

wherein $A$ is the power addition, in dioptres, between the distant-vision center and the close-vision center.

2. Ophthalmic lens as set forth in claim 1, wherein $N$ complies with the relationship:

$$N = 3\ A$$

* * * * *